No. 635,287. Patented Oct. 24, 1899.
E. ANDREAS.
TERMINAL FOR POLE PIECES OF ACCUMULATORS.
(Application filed Apr. 11, 1899.)
(No Model.)
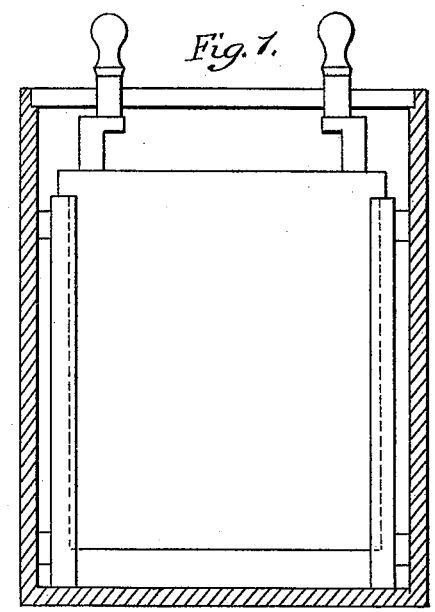
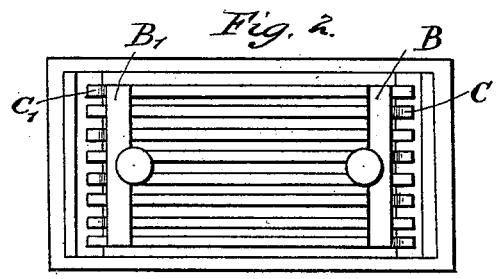
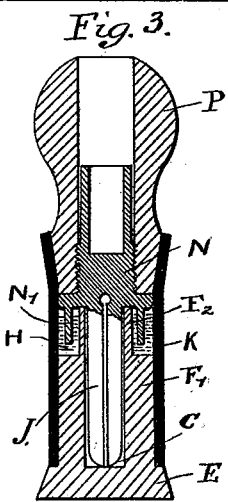

UNITED STATES PATENT OFFICE.

ERNST ANDREAS, OF DRESDEN, GERMANY.

TERMINAL FOR POLE-PIECES OF ACCUMULATORS.

SPECIFICATION forming part of Letters Patent No. 635,287, dated October 24, 1899.

Application filed April 11, 1899. Serial No. 712,659. (No model.)

*To all whom it may concern:*

Be it known that I, ERNST ANDREAS, a citizen of the Kingdom of Prussia, residing at Dresden, in the Kingdom of Saxony and Empire of Germany, have invented certain new and useful Improvements in Terminals for the Pole-Pieces of Accumulators and the Like, of which the following is a specification.

The present invention relates to improvements in storage batteries, in particular such as are used for electric tramways, motor-cars, and the like, and its essential feature consists in the improved manner of connecting the separate poles of the cells forming the storage battery. The most usual manner of connecting up such poles is, as is well known, to form the pole-pieces of the plates of strips of lead soldered to the plates and to lead these upward, soldering them to the conductors. Such a primitive arrangement, however, has many disadvantages, more especially that at the soldered junctions an alteration in the material takes place, whereby resistance is offered to the current. This is often a cause of the lead being fused and not seldom gives rise to outbreak of fire. Furthermore, with such a manner of connecting the pole-pieces it is difficult to provide against leakage or spurting out of the acid from the cells, which again brings other disadvantages in its train. Finally, such a system of connection entails much loss of time in changing the cells. It is the purpose of the present invention to remove all these several disadvantages.

On the accompanying drawings, Figure 1 shows in vertical section an accumulator-cell fitted with the new device. Fig. 2 is a plan view of the same, and Fig. 3 a vertical section of a terminal separately to a larger scale.

The connection of the rows of positive and negative plates C and C', respectively, is effected, as usual, by means of strips or bars of lead B B', which are soldered to the pole-pieces of the positive plates on the one side and to the negative plates on the other. To these lead strips the terminals forming the subject of the present invention are then soldered, most advantageously in the center.

The body proper of the terminal consists of a tubular piece of lead F, Fig. 3, closed at the base, which may be splayed out. This tubular post is connected by solder or in other suitable manner to the lead connecting-strips. It is then passed through a suitable opening in the cover of the cell, above which the terminal projects. A piece of caoutchouc tubing K is sprung over the lower portion F' of the tubular part, which rubber tubing here serves to render the joint in the cover tight.

As the drawings show, the rubber tubing K projects beyond the part F' to a certain extent, and this tubular part F' is recessed at the top to form a thin neck $F^2$. Thus between this part $F^2$ and the rubber tubing there is an annular space H, which is filled with oil. This arrangement is for the purpose of preventing the acid in the cell from penetrating the part F' and rubber tubing K. The acid is by this means wholly prevented from accumulating in the bore G in the terminal. This bore G is for the purpose of receiving a contact-plug I, to the upper end of which a conducting-wire is connected. The plug is screwed into a handle part P, of wood or other insulating material.

The metal connecting-piece N, which is let into the handle P, is provided with an annular projection N', which when the plug is inserted dips into the oil in the reservoir H, thus preventing the acid from reaching the contact-surface.

In order to connect the individual cells while holding the knob P, the plug secured to the end of the conducting-wire is inserted into the hole G in the terminal and the upper end of the rubber tube sprung over the lower end of the handle P. In this manner a contact is made which while it can be readily broken is perfectly secure against this penetration of acid.

Instead of the precise form of construction shown on the drawings any other convenient form of the parts may be used, so long as the essential feature of the invention is not departed from. Thus instead of an annular space H a groove might be provided in the part F', into which is put a packing-ring of tow or the like saturated with oil.

Having now particularly described and ascertained the nature of this invention and in what manner the same is to be performed, I declare that what I claim is—

A terminal for the poles of electrical batteries or the like, comprising a body of lead F, F' having a central bore G and a recessed part forming a neck F² a metallic plug-piece N adapted at its top to receive a connecting-wire and having at its bottom a plug I passing into the said bore G and provided at its center with an annular projection N which covers the said recessed portion F²; a perforated handle P embracing the upper portion of the plug-piece N and secured to it, and a piece of caoutchouc tubing or similar material surrounding and connecting said principal parts F' N P, whereby a reservoir for the reception of oil is formed by the parts F', F², K all substantially as and for the purpose hereinbefore set forth.

In witness whereof I have hereunto set my hand in presence of two witnesses.

ERNST ANDREAS.

Witnesses:
ERNST SCHMATOHE,
HERNANDO DE SOTO.